(12) United States Patent
Bakke (10) Patent No.: US 12,204,555 B2
(45) Date of Patent: Jan. 21, 2025

(54) SYSTEM AND METHOD FOR REDUCING PERCEIVED LATENCY IN A DISPLAY-SERVER COMPUTING SYSTEM

(71) Applicant: Netzyn, Inc., Dallas, TX (US)

(72) Inventor: Steve Bakke, Richardson, TX (US)

(73) Assignee: Netzyn, Inc.

( * ) Notice: Subject to any disclaimer, the term of this patent is extended or adjusted under 35 U.S.C. 154(b) by 0 days.

(21) Appl. No.: 15/418,954

(22) Filed: Jan. 30, 2017

(65) Prior Publication Data

US 2018/0218056 A1 Aug. 2, 2018

(51) Int. Cl.
*G06F 16/25* (2019.01)
*G06F 9/46* (2006.01)
*H04L 67/04* (2022.01)
*H04L 67/08* (2022.01)
*H04L 67/10* (2022.01)

(52) U.S. Cl.
CPC .............. *G06F 16/258* (2019.01); *G06F 9/46* (2013.01); *H04L 67/04* (2013.01); *H04L 67/08* (2013.01); *H04L 67/10* (2013.01)

(58) Field of Classification Search
CPC ......... H04L 67/10; H04L 67/04; H04L 67/08; G06F 17/30569; G06F 16/258; G06F 9/46; G06F 9/452
USPC .......................................................... 707/756
See application file for complete search history.

(56) References Cited

U.S. PATENT DOCUMENTS

| | | | |
|---|---|---|---|
| 2001/0014936 A1* | 8/2001 | Jinzaki | G06F 9/3001 711/221 |
| 2002/0099739 A1* | 7/2002 | Fischer | G06F 16/9577 715/239 |
| 2006/0288306 A1* | 12/2006 | Mahajan | G06F 9/452 715/804 |
| 2007/0183493 A1* | 8/2007 | Kimpe | H04N 19/154 375/240.1 |
| 2010/0111410 A1 | 6/2010 | Lu et al. | |
| 2011/0246904 A1 | 10/2011 | Pinto et al. | |

* cited by examiner

*Primary Examiner* — Kuen S Lu
(74) *Attorney, Agent, or Firm* — The Langley Law Firm, P.C.

(57) ABSTRACT

A method of operations of a display-server computing system includes delivering input by a display device to a server computer over a communications network, processing an application unit of the server computer with the input, responsive to the step of inputting, outputting a result of the processing, together with tags indicative of the input, delivering the result and the tags by the server computer to the display device over the communications network, receiving the result and the tags by the display device, receiving new input to the display device prior to receiving the result and the tags by the display device, and processing a transform of the display device by comparing the tags to the new input to obtain a transformed result.

1 Claim, 14 Drawing Sheets

AppConstantX = 20
AppConstantY = 20      ⎬ 1101

LCDWidth = 200
LCDHeight = 100
FramebufferWidth = 160
FramebufferHeight = 160    ⎬ 1102

MouseXTag, MouseYTag   ⎬ 1103

MouseXCurrent, MouseYCurrent

XOffset = (MouseXCurrent - MouseXTag) + AppConstantX
If (XOffset<0)
    XOffset = 0
If (XOffset+LCDWidth > FramebufferWidth )
    XOffset = XOffset + LCDWidth    ⎬ 1104, 1105

YOffset = (MouseYCurrent - MouseYTag) + AppConstantY
If (YOffset<0)
    YOffset = 0
If ( Yoffset + LCDHeight > FramebufferHeight )
    YOffset = XOffset + LCDHeight    ⎬ 1106

Fig. 12

RoiServerX = 20
RoiServerY = 20  — 1201

MouseXTag, MouseYTag  — 1202

MouseXCurrent, MouseYCurrent  — 1203

RoiX = (MouseXCurrent - MouseXTag) + RoiServerX
RoiY = (MouseYCurrent - MouseYTag) + RoiServerY  — 1204

Fig. 13

AppConstantX1 = 1456.34, AppConstantX2 = 300.2
AppConstantY1 = 13.42, AppConstantY2 = 43.5
AppConstantZ1 = 65.54, AppConstantZ2 = 13.0
⎵
1301

PositionXTag, PositionYTag, PositionZTag
⎵
1302

PositionXCurrent, PositionYCurrent, PositionZCurrent
⎵
1303

PositionX = ( (PositionXCurrent - PositionXTag) * AppConstantX1) + AppConstantX2
PositionY = ( (PositionYCurrent - PositionYTag) * AppConstantY1) + AppConstantY2
PositionZ = ( (PositionZCurrent - PositionZTag) * AppConstantZ1) + AppConstantZ2
⎵
1304

Fig. 14

SYSTEM AND METHOD FOR REDUCING PERCEIVED LATENCY IN A DISPLAY-SERVER COMPUTING SYSTEM

TECHNICAL FIELD

The present invention generally relates to computing systems and more specifically relates to display-server systems and communications networks.

BACKGROUND

End-user computing software programs and their operations (i.e., applications) have traditionally been processed (i.e., run) on an end-user device itself, for example, a personal computer (PC) running an application of the PC, a smartphone running an application on the smartphone, a game console running a game application on the console, and others.

A different approach is to run end-user applications on data center-located servers. These server-run applications are delivered to the end-user device via communicative connection of the end-user display device to the servers. Such a display-server system is described in U.S. Pat. No. 8,700,723 B2.

When the application is run on the remote server versus run on the end-user device a certain amount of lag exists between the user performing an operation and the display being updated. Much of this lag is the communications network latency between the server and display device.

It would be a significant improvement in the art and technology to provide for an application run on a remote server to be perceived by the user as having little difference then the application being run on the end-user device.

SUMMARY

An embodiment of the invention is a system including a server computer, an application unit of the server computer, a user device communicatively connected to the server computer, and a transformer of the user device. The server computer receives input from the user device, processes the application unit with the input, and sends tags and processed data to the user device, the tags relate to the input for processing. The transformer of the user device compares the tags to new input to the user device, and transforms the processed data received from the server computer to transformed data, and the user device outputs the transformed data.

Another embodiment of the invention is a method of operations of a display-server computing system including delivering input by a display device to a server computer over a communications network, processing an application unit of the server computer with the input, responsive to the step of inputting, outputting a result of the processing, together with tags indicative of the input, delivering the result and the tags by the server computer to the display device over the communications network, receiving the result and the tags by the display device, receiving new input to the display device prior to receiving the result and the tags by the display device, and processing a transform of the display device by comparing the tags to the new input to obtain a transformed result.

Yet another embodiment of the invention is a system for communicating with a user device over a communications network including a processor, an application unit communicatively connected to the processor for processing by the processor, a network interface device communicatively connected to the processor and the communications network, and a memory communicatively connected to the processor. The memory includes instruction for causing the processor to receive input from the user device, process the application unit to obtain results, and send to the user device over the communications network results of the processing, together with tags, the tags are indicative of the input received.

Another embodiment of the invention is a system for communicating over a communication network with a server computer including an application unit for processing by the server computer, the system including a processor, a transformer communicatively connected to the processor, a network interface device communicatively connected to the processor and the communication network, and a memory communicatively connected to the processor. The memory includes instruction for causing the processor to deliver input to the server computer over the network, receive a processed result from the application unit of the server computer, together with tags, the tags are indicative of input delivered to the server computer, receive new input to the user device, after delivering input and prior to receiving the processed result and the tags, and process the transformer comparing the tags to new input to obtain an updated processed result.

Yet another embodiment of the invention is a display-server system including a processor, an application unit processable by the processor, a network interface device communicatively connected to the processor and the communication network, a memory communicatively connected to the processor including instruction for causing the processor to receive input from the user device over the communication network, process the application unit for the input received to obtain a processed result, deliver to the user device the processed result, together with tags, the tags are indicative of input received by the server computer, and including a user device processor, a transformer of the user device, processable by the user device processor, a user device network interface device communicatively connected to the application unit over the communication network, and a user device memory communicatively connected to the user device processor including instruction for causing the user device processor to communicate data over the communication network to the application unit, receive the processed result and tags from the processor, communicate additional data over the communication network to the application unit, receive input to the user device processor prior to communicating the additional data, and transform by the transformer the additional data based on the input to the user device processor prior to communicating the additional data.

Another embodiment of the invention is a method of operations of a display-server computing system including delivering input by a display device to a server computer over a communications network, processing an application unit of the server computer with the input, responsive to the step of inputting, outputting a result of the processing, together with tags indicative of the input, delivering the result by the server computer to the display device over the communications network, together with the tags, receiving the result and the tags by the display device, receiving new input to the display device prior to receiving the result and the tags by the display device, generating new sensor data of a sensor of the display device, for delivery to the application unit of the server computer for processing, processing a transformer of the display device by comparing the tags to the new input to obtain a transformed result of the new sensor data as transformed sensor data, and communicating the transformed sensor data to the server computer by the display device.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
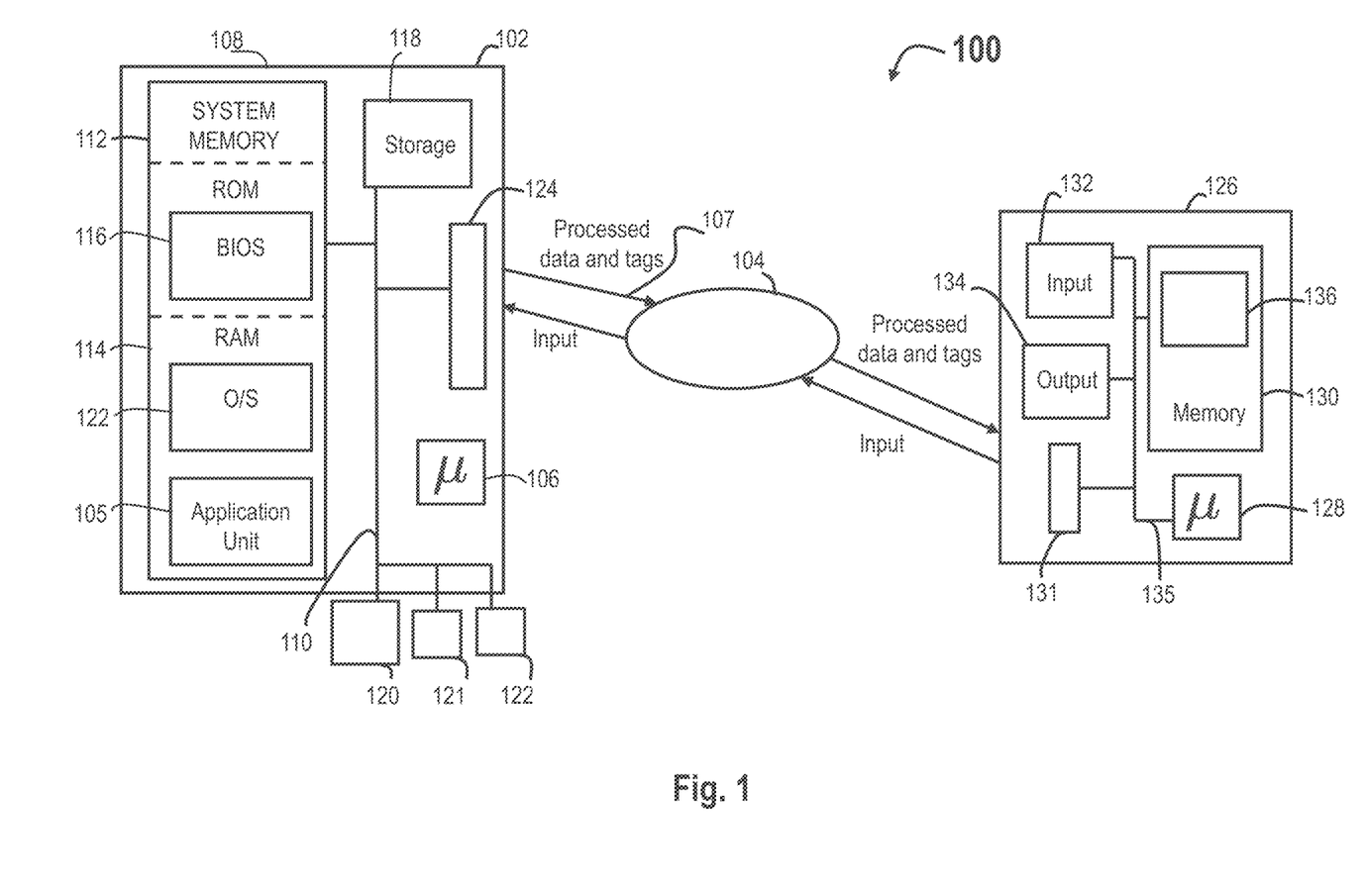
FIG. 1 illustrates a display-server system, according to certain embodiments of the invention.

Referring to FIG. 1, a non-exclusive example embodiment of a system 100 includes a server computer 102 communicatively connected to a communications network 104. The server computer 102 processes an application unit 105 of or accessible to the server computer 102. The server computer 102 includes one or more computer system including a processor 106, memory 108, and a system bus 110 that couples system components, including the memory 108, to the processor 106. The memory 108 may include a read only memory (ROM) 112 and a random access memory (RAM) 114. A basic input/output system (BIOS) 116 containing the basic routines that help to transfer information between elements within the computer system is stored in the ROM 112. The server computer 102 also includes a storage drive 118, and may also include other readable and writable storage 120. The server computer 102 may also include input peripheral device 121 and output peripheral device 122. The storage drive 118, the other storage 120, and the peripheral devices 121, 122 are connected to the system bus 110 by relevant interface. A number of modules can be stored in the memory 108, storage drive 118 or other storage 120, including an operating system 122 and the application unit 105. The server computer 102 also includes a communication interface device 124 for receiving and sending information over the communications network 104.

Although the server computer 102 is illustrated as a single device, the server computer 102 could be a distributed computing system comprised of more than one server or computing device. The server computer 102 may, for example, be a cloud server.

A display device 126 is communicatively connected to the communications network 104. The display device 126 provides inputs communicated over the communications network 104 to the server computer 102 for operations of the application unit 105, and receives outputs of the application unit 105 and tags 107 from the server computer 102. The tags 107 are indicia of the inputs received by the server computer 102 from the display device 126 for processing the application unit 105. The display device 126 includes at least a processor 128, memory 130, input device 132, and output device 134. A system bus 135 connects the memory 130, as well as the input device 132 and output device 134, to the processor 128. The display device 126 also includes a communication interface device 131 for sending and receiving information over the communications network 104. The memory 130 includes a transform module 136 for operating on the tags 107 received from the server computer 102.

The display device 126 may have limited or other processing capability. The display device 126 communicates over the network 104 with the server computer 102. The server computer 102 provides processing of the application unit 105 accessed for input by and output to the display device 126. The server computer 102 receives inputs to the display device 126 communicated over the network 104, and sends processed data from the application unit 105 and tags 107 to the display device 126 for output. The display device 126 receives the tags 107 from the server computer 102, together with processed data from the application unit 105, and the transform module 136 operates with the tags 107 to affect the processed data for output on the display device 126.

The communications network 104 includes any wired or wireless telecommunications system by which networked devices, such as the server computer 102 and the display device 126, can exchange data. For example, the network 104 can include a local area network (LAN), a wide area network (WAN), an intranet, an Internet, or any combination.

An example embodiment of the system 100 includes a 3D rendering engine as the application unit. The display device 126 inputs a directive for communication over the network 104 to the server computer 102. That input is received by the server computer 102. The server computer 102 processes the 3D rendering engine according to the input. The server computer 102 then returns a framebuffer as processed data to the display device 126 together with tags 107 associated with the inputs that were received by the server computer 102. The transform module 136 of the display device 102 operates on the tags 107 by comparing them to current inputs to the display device. The transform module 136 operates with the tags 107 to affect the framebuffer received for output by the display device 126.

Figure 2:
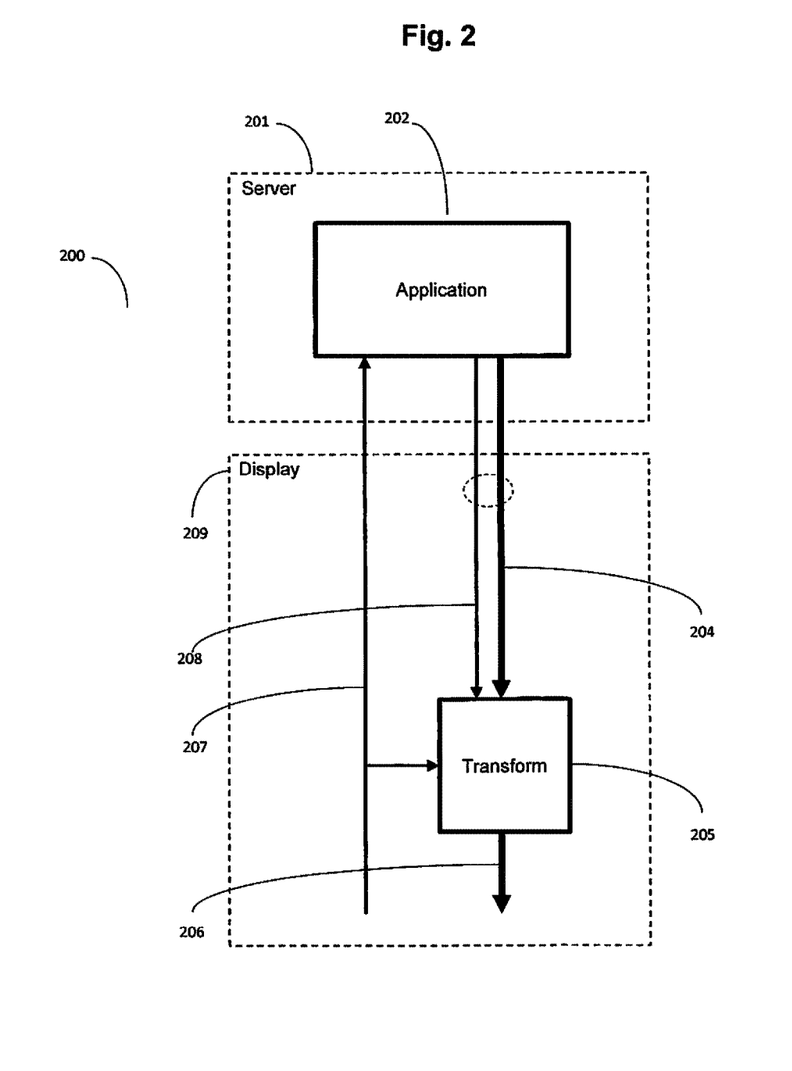
FIG. 2 illustrates a server computer communicating with a user device having a transformer, according to certain embodiments of the invention.

Referring to FIG. 2, a system 200 includes a server computer 201, such as the server computer 102, communicating with a user device 209, such as the display device 126. The user device 209 sends input 207 directives from the user device 209 to the server computer 201. The server computer 201 processes an application 202, such as the application unit 105, based on the input 207. The server computer 201 returns to the user device 209 a processed data 204, for example a processed framebuffer or other processed data, together with tags 208 indicative of the input 207 to the application 202. A transformer 205, such as the transform module 136, of the user device 209 compares the tags 208 to any more current input to the user device 209, and transforms the processed data 204 received for display or other output by the user device 209 to updated data 206. The updated data 206 is output by the user device 209.

In effect, the server computer 201 receives input 207 from the user device 209, processes the input 207 and sends back processed data 204. Bundled with the processed data 204 are tags 208 which specify values of input 207 that the application 202 processed to create the processed data 204.

The user device 209 receives the processed data 204 and tags 208 and sends these to the transformer 205. The transformer 205 uses the difference in the tags 208 and any more recent input to the user device 209 to operate on the processed data 204. The result of the operation is updated data 206. The updated data 206 reflects the current state of input to the user device 209. The transformer 205 continues to create the updated data 206 with changes of input to the user device 209, without any actions of the server computer 201 sending further processed data 204 from the application 202.

Although single streams of processed data 204 and tags 208 are illustrated, it should be understood that multiple streams are possible.

Figure 3:
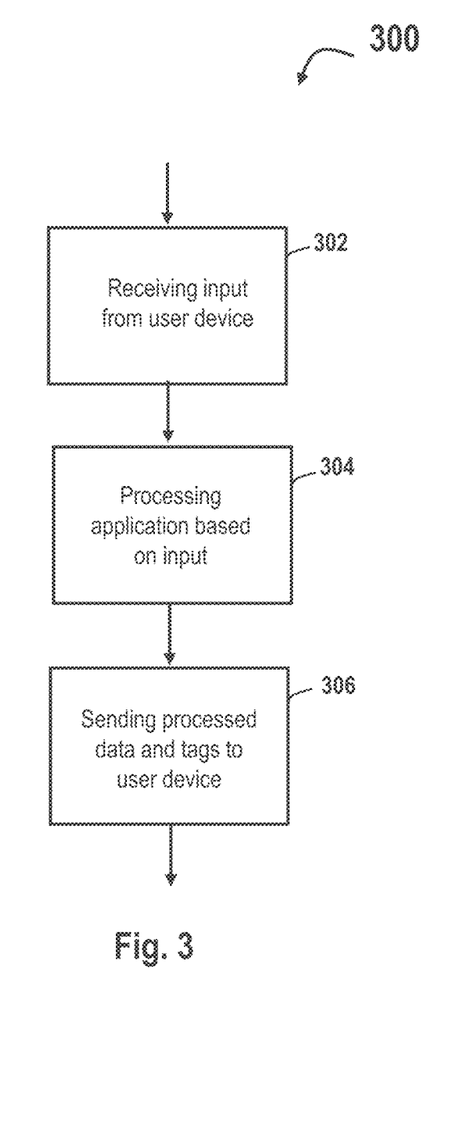
FIG. 3 illustrates operation of a server computer, according to certain embodiments of the invention.

Referring to FIG. 3, a method 300 of operation of a server computer, such as the server computer 102 or 201, includes receiving input 302 from a user device. The server computer receives the input and processes 304 an application, such as an application program, based on the input. The server computer then sends 306 processed data of the application to a user device over a network, together with tags indicative of the input on which the processed data is obtained.

Figure 4:
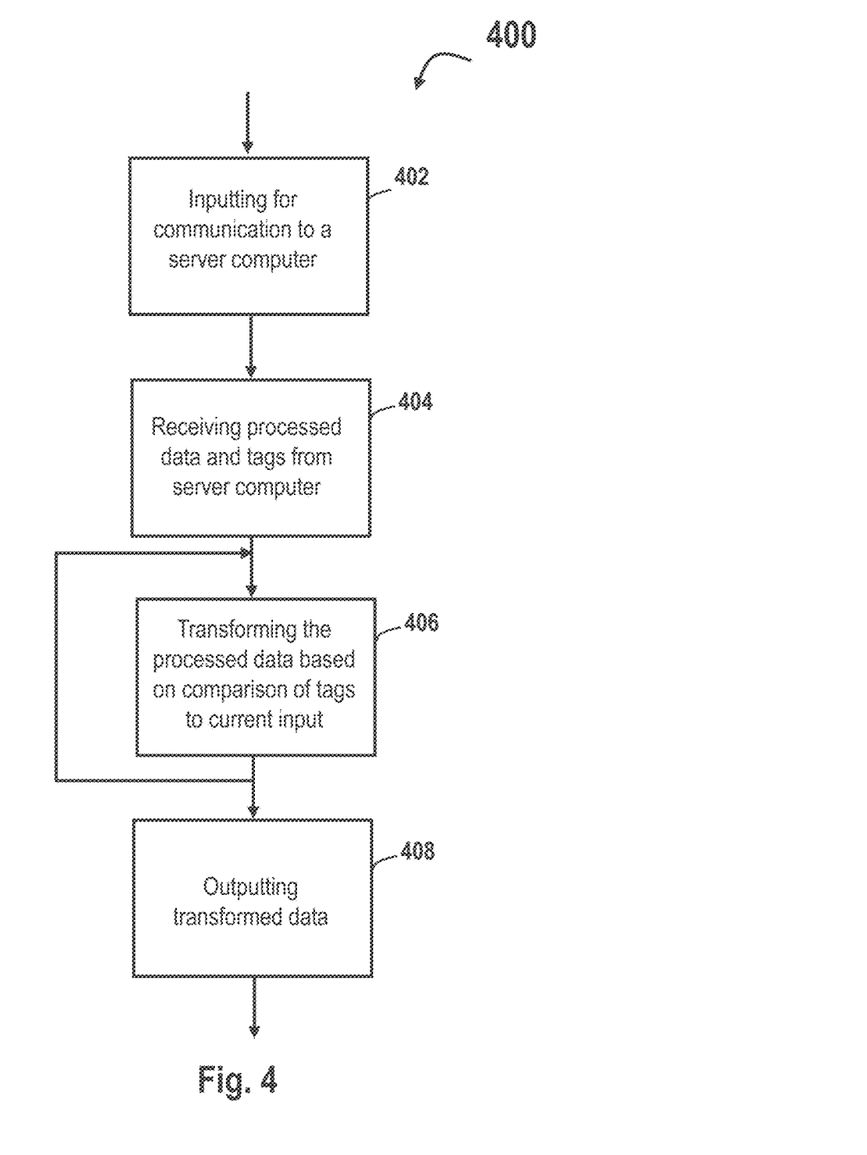
FIG. 4 illustrates operation of a user device, according to certain embodiments of the invention.

Referring to FIG. 4, a method 400 of operation of a user device, such as the display device 126 or user device 209, includes input 402 to the user device communicated over the network to a server computer. The server computer processes an application with the input, and returns to the user device processed data and tags indicative of the input on which the processed data is obtained. The user device receives 404 the processed data and tags. The user device transforms 406 the processed data based on comparison of the tags to any more current input to the user device. The user device 408 outputs transformed data 408 on the user device.

Figure 5:
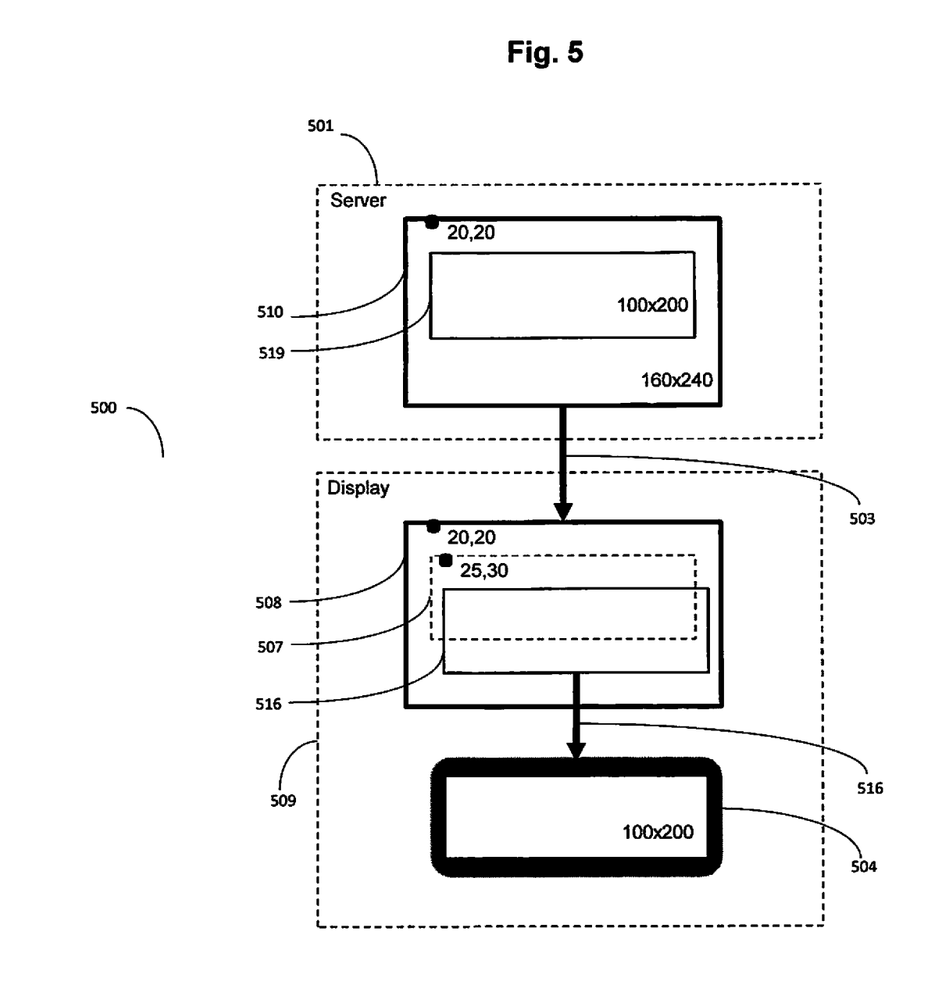
FIG. 5 illustrates an example embodiment of an offset display in a user device having a transformer, according to certain embodiments of the invention.

Referring to FIG. 5, an example embodiment of the foregoing includes a video rendering engine as the application of a server computer 501 accessed by a display device 509. The video rendering engine includes a framebuffer 510 of the server computer. The application of the server computer sends framebuffer data 503 for display on an LCD 504 of the user device 509. The application of the server computer 501 has created the framebuffer 510 with dimensions of 160×240, even though the LCD 504 has size 519 of 100×200. The larger framebuffer 510 is processed by a transformer in the user device 509 to adjust the area which is actually displayed in the LCD 504.

Further, the application based on the last received input from the user device 509 fills the framebuffer 510 with data where the actual LCD 504 display area 507 is at offset 20,20. If no further inputs to the user device have occurred, the area 507 would be displayed on the LCD 504 at offset 20,20.

If, however, further inputs to the user device have occurred, the framebuffer data 503 is sent to the user device 509 and is placed in framebuffer 508 of the user device 509. Framebuffer 508 has the area 507 at offset 20,20 that the application 102 determined should be placed on the LCD 304 based on the input that had been received. However, the new input to the user device has changed and the transformer of the user device 509 uses the new input and the tags to determine that area 516 at offset 25,30 should instead be displayed on the LCD. Area 516 is sent to the LCD for display on the user device 509.

Figure 6:
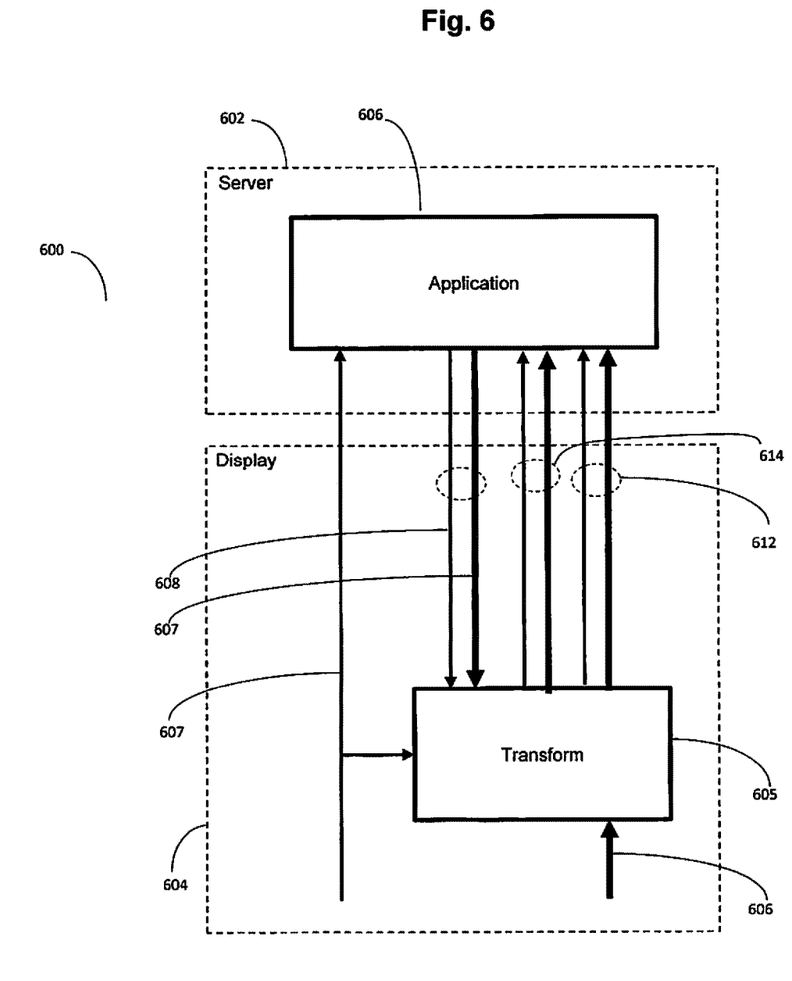
FIG. 6 illustrates a server computer communicating with a user device having a transformer, according to certain embodiments of the invention.

Referring to FIG. 6, a system 600 includes a server computer 602 communicatively connected to a display 604. The server computer 602 includes an application unit 606. The display 604 communicates with the server computer 602 providing inputs for processing by the application unit 604.

The application unit 604 running on the server computer 602 receives inputs 607 and data 612 from the display 604. The application unit 604 processes the inputs 607 and data 612, and sends back to the display 604 processed data 617 and tags 618. The tags 618 specify values of inputs 607 that were received by the server computer 602 from the display 604 for processing of the processed data.

The display 604 has data 606 to send to the application unit 604. Before the data 606 is sent to the server computer 602 by the display 604, the data 606 is operated on by a transformer 605 of the display 604. The transformer 605 transforms the data 606 to transformed data 614 based on differences between new input to the display 604 compared to the tags 618 received from the server computer 602. The transformed data 614 is sent to the server computer 602 for processing by the application unit 604. Together with the transformed data 614, inputs that created the data 614 are sent by the display 604 to the server computer 602. The inputs sent by the display 604 specify values of the new inputs used to create the transformed data.

Figure 7:
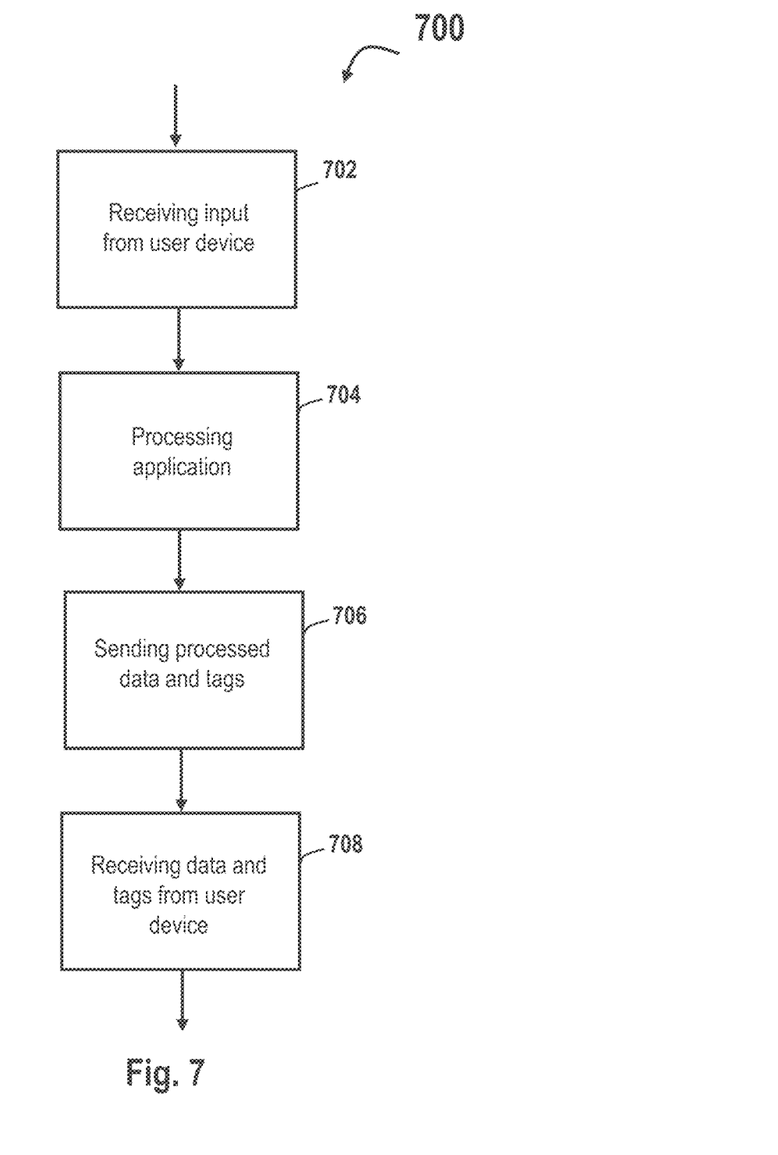
FIG. 7 illustrates operation of a server computer, according to certain embodiments of the invention.

Referring to FIG. 7, a method 700 of operation of a server computer, such as the server computer 602, includes receiving input 702 from a user device, such as the display 604. The server computer receives the input and processes 704 an application, such as an application program, based on the input. The server computer then sends 706 processed data of the application to a user device over a network, together with tags indicative of the input on which the processed data is obtained. The user device has data to send to the server computer, together with inputs employed to create the data. The server computer receives 708 the data and inputs.

Figure 8:
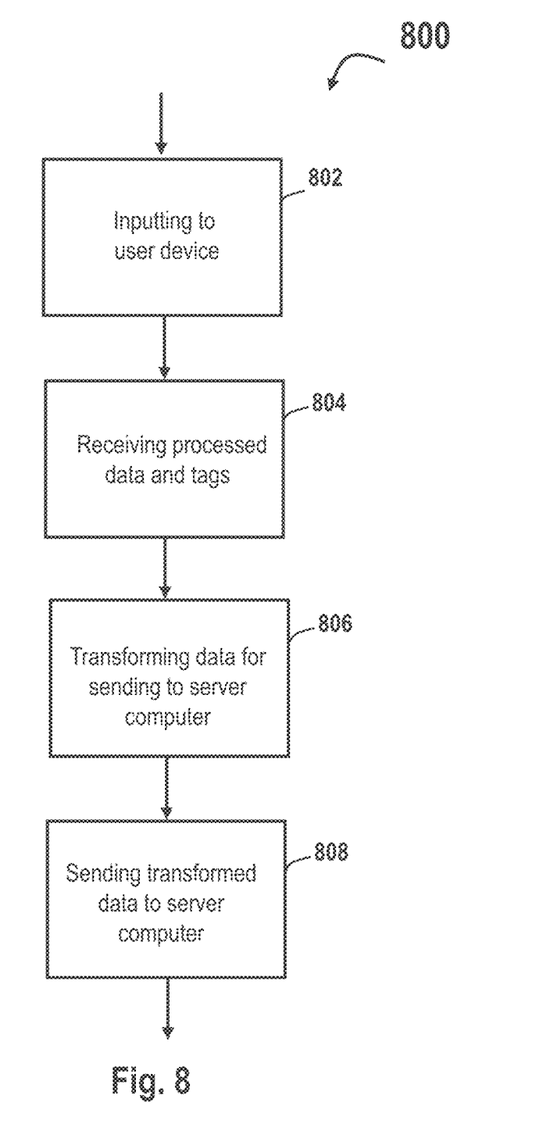
FIG. 8 illustrates operation of a display, according to certain embodiments of the invention.

Referring to FIG. 8, a method 800 of operation of a user device, such as the display 604, includes input 802 to the user device communicated over the network to a server computer. The server computer processes an application with the input, and returns to the user device processed data and tags indicative of the input on which the processed data is obtained. The user device receives 804 the processed data and tags. The user device has data to send to the server computer. The user device transforms 806 the data to transformed data for sending to the server computer based on comparison of the tags to any more current input to the user device. The user device sends 808 the transformed data to the server computer, together with identifiers specifying the values of the more current input.

Figure 9:
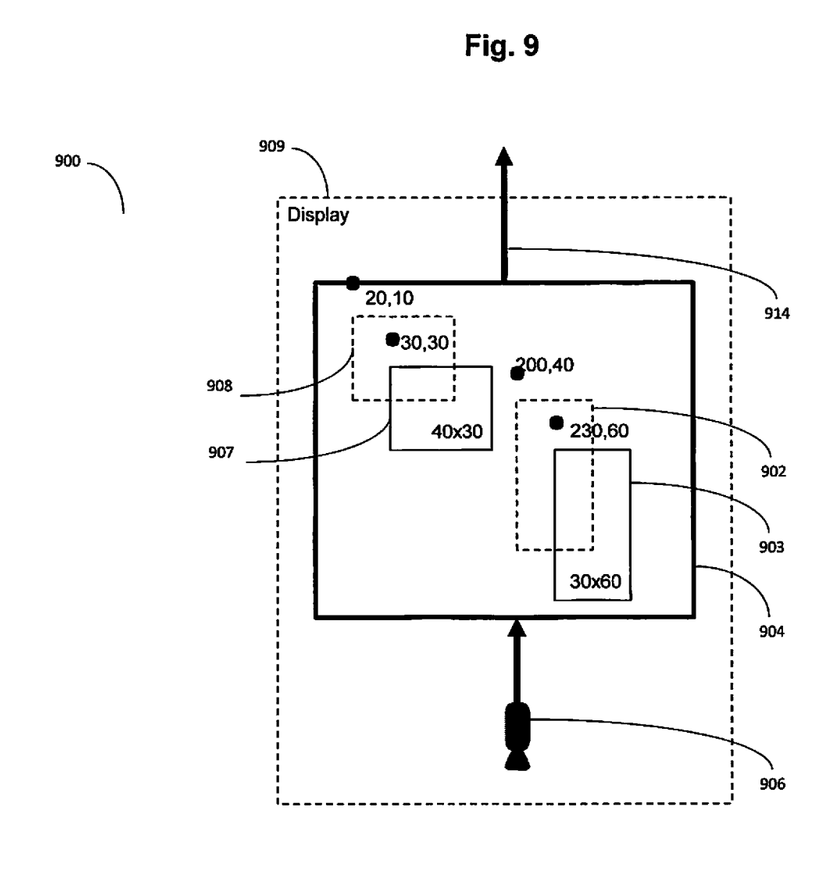
FIG. 9 illustrates an example embodiment of a changed area in a display having a transformer, according to certain embodiments of the invention.

Referring to FIG. 9, an example embodiment of the foregoing includes a display device 909 with a camera 906.

The camera 906 has created a framebuffer 904 which will be sent 914 to the application of a server computer. Based on inputs received by the application, the application of the server computer has sent data to the display. The data specifies two regions of interest, ROTA 908 and ROIB 902. The application has bundled tags with the data. The tags indicate the input that was used by the application to create the regions of interest, ROTA 908 and ROIA 902. The application has placed ROIA 908 at position 20,10 and ROIB 902 at position 200,40.

The display 904 receives the data and tags from the application of the server computer. The display 904 includes a transformer that compares more current inputs to the display 904 to the tags from the server computer. The transformer updates the region of interest positions. For example, ROIA 907 is positioned at 30,30 and ROIB 903 is positioned at 230,60. The transformer sets a mask to black out all areas except ROIA 907 and ROIB 903. The specifying of the regions of interest and blacking out the rest of the framebuffer greatly reduces the bandwidth to send the framebuffer to the application of the server computer.

Figure 10:
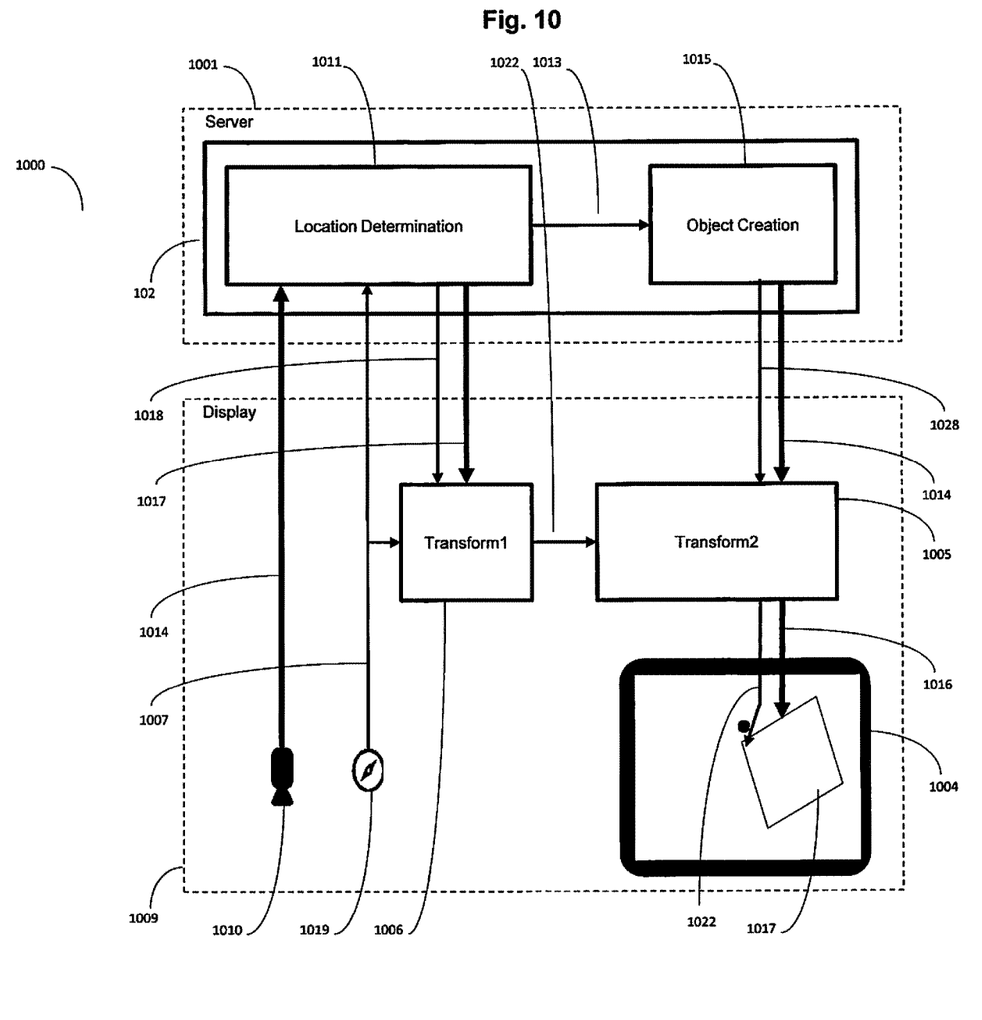
FIG. 10 illustrates an example embodiment of a display having two transformers, one for locating an object in a display and another for varying the object displayed, according to certain embodiments of the invention.

Referring to FIG. 10, in conjunction with FIGS. 2 and 6, an example embodiment of the foregoing includes a server computer 1001 processing a location determination module 1011 and an object creation module 1015 as an application. A display device 1009 with a camera 1010, sensor 1019, and LCD 1004 communicatively connects to the application of the server computer 1001. The display device 1009 includes a first transformer 1006 and a second transformer 1005.

The location determination module 1011 receives input 1007 from the sensor 1019 and data 1014 from the camera 1010 in the display device 1009. Based on the camera data 1014 and sensor input 1007, the location determination module 1011 determines the pixel location 1013 to place a 3D object on the LCD 1004. The location determination module 1011 also sends data 1017 and associated tags 1018 to the display device 1009 for operations of the first transformer 1006.

The object creation module 1015 uses the pixel location 1013 to create an object framebuffer data 1014. The object creation module 1015 also sends to the display device 1009 tags 1028 containing the pixel location 1013 that was used to create the object framebuffer data 1014.

The display device 1009 processes the first transformer 1006 using the data 1017 and associated tags 1018 sent from the location determination module 1011 together with current sensor input 1007 to create a local 3D pixel location 1022. The display device 1009 processes the second transformer 1005 using the local 3D pixel location 1022, the object framebuffer data 1014 and the tags 1028 which contain the server 3D pixel location to create an updated framebuffer data 1016. The updated framebuffer data 1016 is used by the display device 1009 to draw an object 1017 on the LCD 1004.

Figure 11:
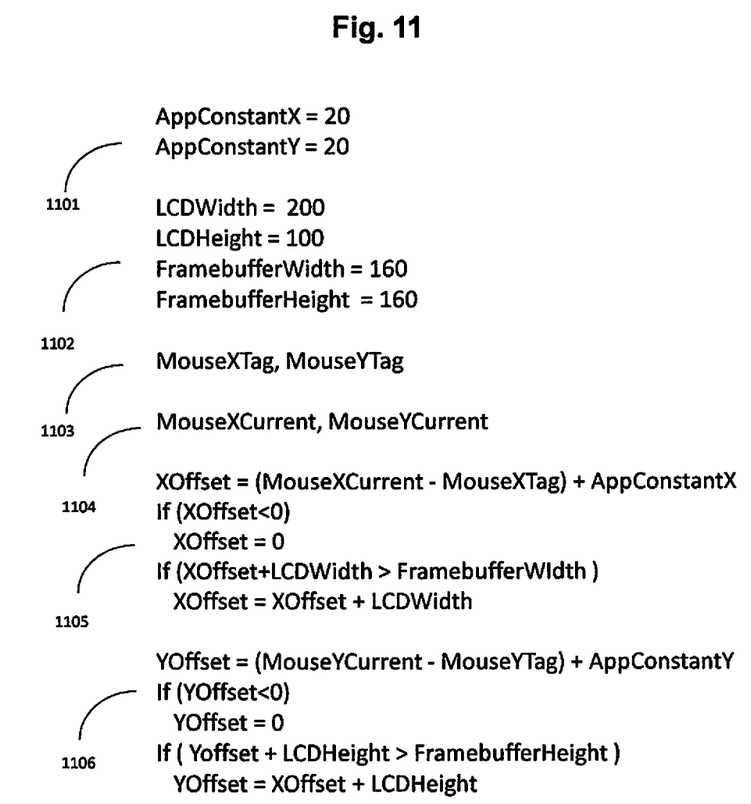
FIG. 11 illustrates a transformer of a user device for determining X Offset and Y Offset for display, according to certain embodiments of the invention.

Referring to FIG. 11, operations of a transformer, such as that of the example embodiment of FIG. 5, determine X Offset 1105 and Y Offset 1106 of an area to be displayed on an LCD of a display device based on mouse inputs. Constants 1101 are sent from the processed application of a server computer to the display device. Values 1102 are dimensions of the framebuffer and LCD of the display device which are known to the display device. Tags 1103 are sent by the server computer to the display device indicative of inputs received by the server computer for processing. Current mouse inputs 1105 are known values of the display device.

The X Offset 1105 computes the X offset of the area, making sure the area is always visible. The Y Offset 1106 computes the Y offset of the area, making sure the area is always visible. The X offset and Y offset are computed when either new mouse inputs occur or when new data is sent by the application of the server computer to the display device.

Figure 12:
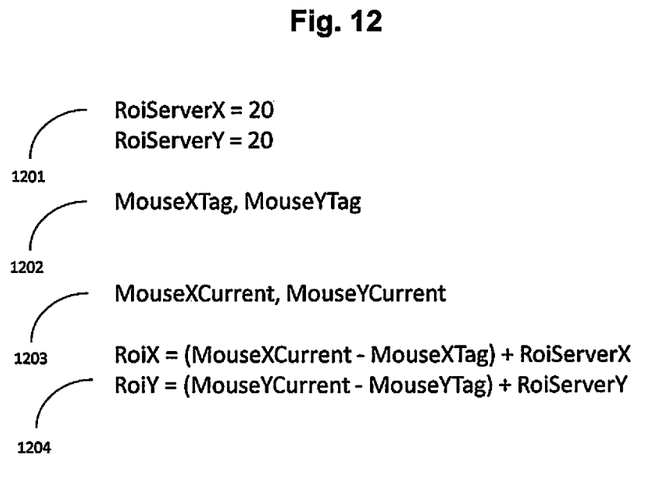
FIG. 12 illustrates a transformer of a user device for determining a first and second regions of interest, according to certain embodiments of the invention.

Referring to FIG. 12, operations of a transformer, such as that of the example embodiment of FIG. 9, determine offsets for a region of interest to be displayed on an LCD of a display device based on mouse inputs. Operations of the transformer would occur for each region of interest. Constants 1201 are sent from the processed application of a server computer to the display device. Values 1202 are tags sent from the processed application to the display device indicative of inputs processed by the processed application. Values 1203 are the current input. Region of interest offsets 1204 are computed when either new mouse inputs occur or when new data is sent by the application of the server computer to the display device.

Figure 13:
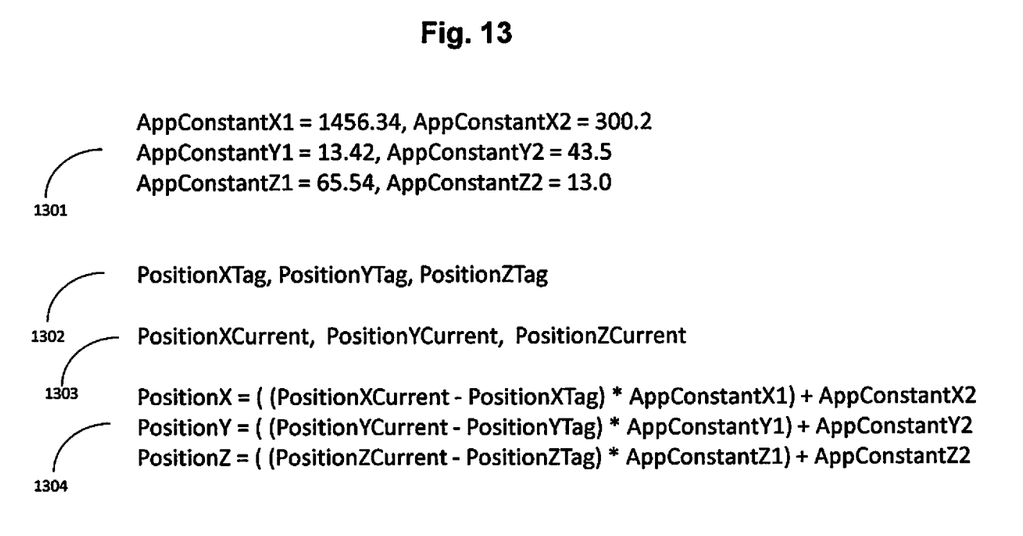
FIG. 13 illustrates a transformer for determining location for display of a 3D object, according to certain embodiments of the invention.

Referring to FIG. 13, operations of a first transformer, such as that of the example embodiment of FIG. 10, determine the 3D position of an object to be displayed on an LCD of a display device based on sensor inputs of the display device. Constants 1301 are sent from the processed application of a server computer to the display device. Values 1302 are tags sent from the processed application to the display device indicative of inputs processed by the processed application. Value 1303 are the current sensor input. Updated X, Y, and Z positions 1304 for the 3D position of the object for display are computed when either new camera or sensor input occurs on the display device or new data is sent by the application of the server computer to the display device.

Operations of a second transformer, such as that of the example of FIG. 10, are similar to the operations of the transformer illustrated in FIG. 11.

Figure 14:
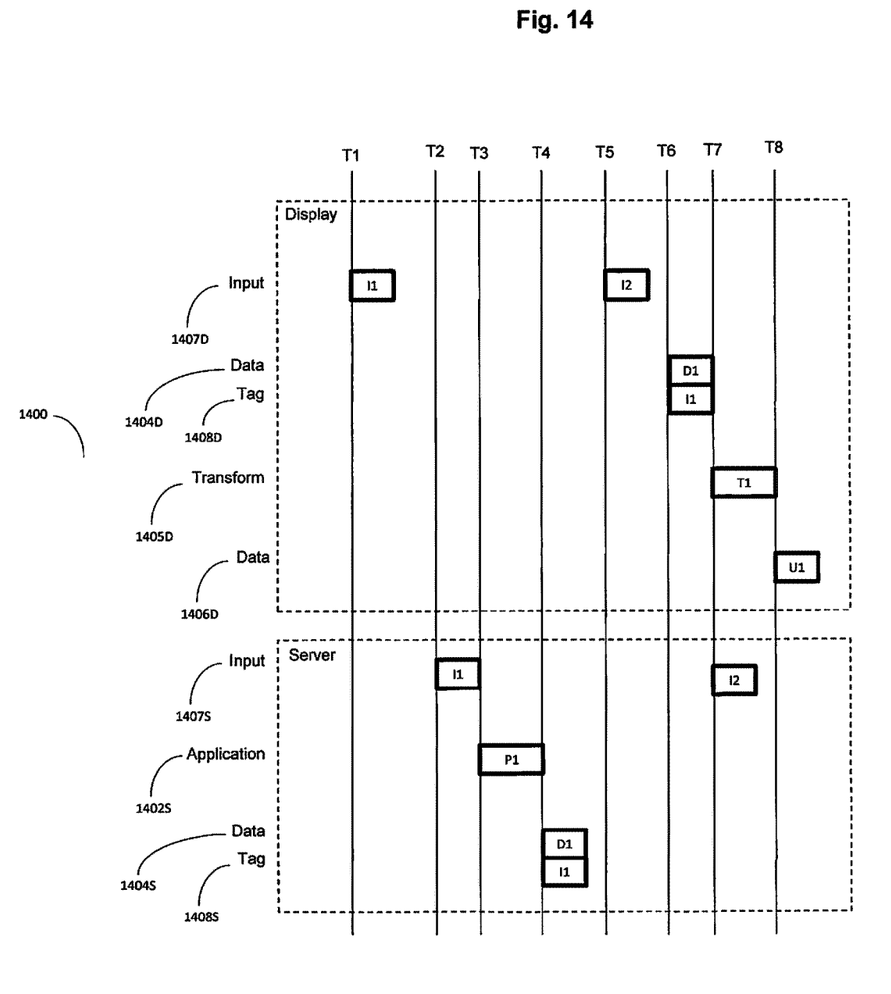
FIG. 14 illustrates timing of signals for a display and server, the display having a transformer, according to certain embodiments of the invention.

Referring to FIG. 14, a timeline for operations of the transformer of FIG. 2, includes input 1407D in the display is sent at time T1 to the server and arrives some time later at time T2 as input 1407S. The application in the server processes that input 1407S at time T3 and generates data 1404S and tags 1408S at time T4. Input to the display occurs after the input 1407D, for example, at time T5. Data 1404S and tags 1408S are sent by the server to the display at time T4, and arrive some time later at time T6 at the display as data 1404D and tags 1408D. The display transforms 1405D the data 1404D at time T7 using tags 1408D and local input to the display, creating data 1406D. The transformed data is output by the display at time T8.

The timeline continues for operations of the transformer with each new input 1407D in the display.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and device(s), connection(s) and element(s) that may cause any benefit, advantage, or solution to occur or become more pronounced are not to be construed as a critical, required, or essential feature or element of any or all the claims. As used herein, the terms "comprises, "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A display-server system, comprising:
   a server processor;
   an application unit processed by the server processor;
   a server network interface device communicatively connected to the server processor and the communication network; and
   a server memory communicatively connected to the server processor, the server memory includes instruction for causing the server processor to:
   send by the server processor an image to a user device over the communication network;
   receive by the server processor from the user device in respect of the image a first input from the user device over the communication network;
   process by the server processor the application unit for the first input received to obtain a processed result corresponding to a next image; and
   deliver to the user device the processed result, together with tags, the processed result is renderable by the user device as the next image and the tags are indicative of the first input received by the processor; and
   further comprising:
   a user device processor;
   a transformer processed by the user device processor;
   a display communicatively connected to the transformer;
   a user device network interface device communicatively connected to the application unit over the communication network;
   a user device memory communicatively connected to the user device processor, the user device memory includes instruction for causing the user device processor to:
   render the image in the display, the image corresponds to the processed result;
   receive a second input to the display in respect of the image;
   deliver the second input over the communication network to the application unit;
   the server memory includes further instruction for causing the server processor to:
   receive the second input by the application unit;
   process the second input by the application unit to obtain a next processed result corresponds to a next image for delivery to the display;
   send the next processed result, together with second tags, the second tags are indicative of the second input;
   the user device memory includes further instruction for causing the user device processor to:
   receive the second processed result and second tags from the server processor;
   receive a third input to the user device processor prior to receiving the second processed result and second tags; and
   transform by the transformer the second processed result to obtain a third image displayed in the display, based on comparison by the transformer of the s third input to the second tags.

* * * * *